United States Patent
Lutz et al.

(10) Patent No.: US 11,308,482 B2
(45) Date of Patent: *Apr. 19, 2022

(54) SYSTEM, METHOD, AND COMPUTER-ACCESSIBLE MEDIUM FOR BLOCKING MALICIOUS EMV TRANSACTIONS

(71) Applicant: Capital One Services, LLC, McLean, VA (US)

(72) Inventors: Wayne Lutz, Fort Washington, MD (US); Jeffrey Rule, Chevy Chase, MD (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/924,582

(22) Filed: Jul. 9, 2020

(65) Prior Publication Data

US 2021/0110379 A1  Apr. 15, 2021

Related U.S. Application Data

(63) Continuation of application No. 16/653,305, filed on Oct. 15, 2019, now Pat. No. 10,755,262.

(51) Int. Cl.
*G06Q 20/00* (2012.01)
*G06Q 20/34* (2012.01)
*G06Q 20/40* (2012.01)

(52) U.S. Cl.
CPC ......... *G06Q 20/352* (2013.01); *G06Q 20/341* (2013.01); *G06Q 20/3563* (2013.01); *G06Q 20/4093* (2013.01)

(58) Field of Classification Search
CPC ............... G06Q 20/352; G06Q 20/341; G06Q 20/3563; G06Q 20/4093
(Continued)

(56) References Cited

U.S. PATENT DOCUMENTS 10,755,262 B1 * 8/2020 Lutz .................. G06Q 20/3563
2008/0162312 A1   7/2008 Sklovsky et al.
(Continued)

FOREIGN PATENT DOCUMENTS

| EP | 2 139 196 | 12/2009 |
| EP | 2 763 370 | 8/2014 |
| WO | 2006/070189 | 7/2006 |

OTHER PUBLICATIONS

Advanced NFC Overview, Android Developers [retrieved on May 27, 2019]. Retrieved from Internet URL: https://developer.android.com/guide/topics/connectivity/nfc/advanced-nfc, 7 pages.
(Continued)

*Primary Examiner* — Daniel A Hess
(74) *Attorney, Agent, or Firm* — Hunton Andrews Kurth LLP

(57) ABSTRACT

An exemplary system, method, and computer-accessible medium can include, for example, storing on a first device an applet configured to generate a digital tag; receiving a request at the first device for information; configuring the digital tag to be associated with at least one of (i) an application or (ii) an input on a second device, such that receipt of the digital tag by a second device causes the application to launch on the second device; and emitting from the first device a digital tag.

20 Claims, 7 Drawing Sheets

(58) Field of Classification Search
USPC .......................................................... 235/380
See application file for complete search history.

(56) References Cited

U.S. PATENT DOCUMENTS

| | | |
|---|---|---|
| 2013/0106576 A1 | 5/2013 | Hinman et al. |
| 2013/0130614 A1 | 5/2013 | Busch-Sorensen |
| 2015/0089586 A1 | 3/2015 | Ballesteros |
| 2016/0055336 A1 | 2/2016 | Ryu |

OTHER PUBLICATIONS

Near Field Communication Overview, Android Developers [retrieved on May 27, 2019]. Retrieved from Internet URL: https://developer.android.com/guide/topics/connectivity/nfc, 2 pages.

Host-Based Card Emulation Overview, Android Developers [retrieved on May 27, 2019]. Retrieved from Internet URL: https://developer.android.com/guide/topics/connectivity/nfc/hce, 18 pages.

NFC Basics, Android Developers [retrieved on May 27, 2019] Retrieved from Internet URL: https://developer.android.com/guide/topics/connectivity/nfc/nfc, 27 pages.

Notification of Transmittal of the International Search Report and the Written Opinion of the International Searching Authority issued in PCT/US2020/054826, dated Dec. 23, 2020.

\* cited by examiner

RECORD 101

PROCESSOR 102

COMMUNICATION INTERFACE 103

FIRST DEVICE COMMUNICATION FIELD 104

MEMORY 105

SYSTEM, METHOD, AND COMPUTER-ACCESSIBLE MEDIUM FOR BLOCKING MALICIOUS EMV TRANSACTIONS

CROSS REFERENCE TO RELATED APPLICATION

The subject application is a continuation of U.S. patent application Ser. No. 16/653,305 filed Oct. 15, 2019, the contents of which is hereby incorporated by reference in its entirety.

FIELD OF THE DISCLOSURE

The present disclosure relates generally to precluding undesired application launching and unauthorized transaction execution. More specifically, the present disclosure relates to precluding application activity by blocking user data received via near-field communication.

BACKGROUND INFORMATION

Portable electronic devices, such as smart phones, tablets, and laptop computers, are ubiquitous. These devices often support multiple means of wireless communication, including near-field communication (NFC) involving data communications established within a short-range communication field.

Europay, Mastercard, and Visa ("EMV") standard-based cards are smart cards that store information on magnetic strips (for backwards compatibility with older machines) and additionally on integrated circuits. EMV cards are smart cards, and are also called chip cards or IC cards. These include cards that must be physically inserted into a reader. These also include contactless cards that can be read over a short distance using near-field communication (NFC) technology. EMV is a payment method based upon a technical standard for smart payment cards and for payment terminals and automated teller machines that can accept them.

A typical credit card is configured with a contactless chip which allows for a credit card transaction to occur without a user swiping or otherwise physically engaging his or her credit card with a credit card reader. A contactless chip allows for wireless and contactless communication with an appropriate device for easily using a credit card. For example, NFC can be used to allow for a payment to be made wirelessly.

However, many credit cards are configured to allow access to the encoded credit card information by any suitable receiving device. This can lead to security problems, particularly in the context of a mobile device capable of reading data from a contactless chip. Mobile devices configured with, for example, an NFC reader are capable of reading credit card information from a card chip. This can allow the mobile device to read the information on the card whenever the credit card is within the range of the NFC field of the mobile device.

Malicious software exists that can be installed on a mobile device without the user of the mobile device being aware of the presence of the malicious software. This malicious software can be used to access the information on the smartcard. This software can even be part of other legitimate applications as pieces of code that have been integrated therein. In this case, whenever the credit card is in close proximity (purposely or inadvertently) to the mobile device, the malicious software may cause the mobile device to read the information from the credit card. On certain mobile device operating systems, such as the Android operating system, particular applications may be initiated or opened in the presence of an NFC field generated by specific cards, such as for example, smart cards, bank cards, identity cards, membership cards, credit cards, debit cards, and gift cards. For example, upon the Android operating system detecting an NFC field, an application can take advantage of the detection of the field to cause itself to launch (in the background or otherwise unknown to the user) and communicate with the card to retrieve certain information. Thus, sensitive user credit card information can be stolen by malicious software that is configured to listen and wait for any NFC field generated by a specific smart card and take the information from the credit card (or other device). Once stolen, this information can be stored by the malicious software on the user device. This information can then be sent by the malicious software, unknown to the user, to a server where it can be used for fraudulent purposes such as to conduct fraudulent and unauthorized transactions.

Thus, it can be beneficial to provide exemplary system, method, and computer-accessible medium, which prevents malicious applications from conducting EMV transactions.

SUMMARY OF EXEMPLARY EMBODIMENTS

Example embodiments of the present disclosure provide systems, methods, and computer-accessible mediums that can facilitate blocking of malicious activities and malicious software from taking action based on received or intercepted data.

Embodiments of the present disclosure provide a method, comprising: storing on a first device an applet configured to generate a digital tag; receiving a request at the first device for information; configuring the digital tag to be associated with at least one of (i) an application or (ii) an input on a second device, such that receipt of the digital tag by a second device causes the application to launch on the second device; and emitting from the first device a digital tag.

Embodiments of the present disclosure provide a system, comprising: a contactless smartcard; and a user device configured to: automatically request from the contactless smartcard user information upon physical proximity with the contactless smartcard; receive from the contactless smartcard a digital tag; and launch, responsive to the tag, an application associated with the received tag.

Embodiments of the present disclosure provide a contactless card comprising a processor, a communication interface, and a non-transitory computer-accessible medium having stored thereon computer-executable instructions, wherein when the instructions are executed by the processor the contactless card is configured to perform procedures comprising: receiving a request for information via the communication interface; and emitting a NFC Data Exchange Format (NDEF) tag, wherein: the tag is configured to be an Android Application Record (AAR) tag, the tag is associated with an applet stored on the contactless credit card, and the tag is configured to be associated with at least one of (i) an application or (ii) an input on a first device, such that the tag is configured to launch the application upon receipt by the first device.

Further features of the disclosed design, and the advantages offered thereby, are explained in greater detail hereinafter with reference to specific example embodiments illustrated in the accompanying drawings.

BRIEF DESCRIPTION OF THE DRAWINGS

FIG. 1 is a diagram illustrating a first device according to an example embodiment of the present disclosure.

DETAILED DESCRIPTION OF EXEMPLARY EMBODIMENTS

Figure 2:
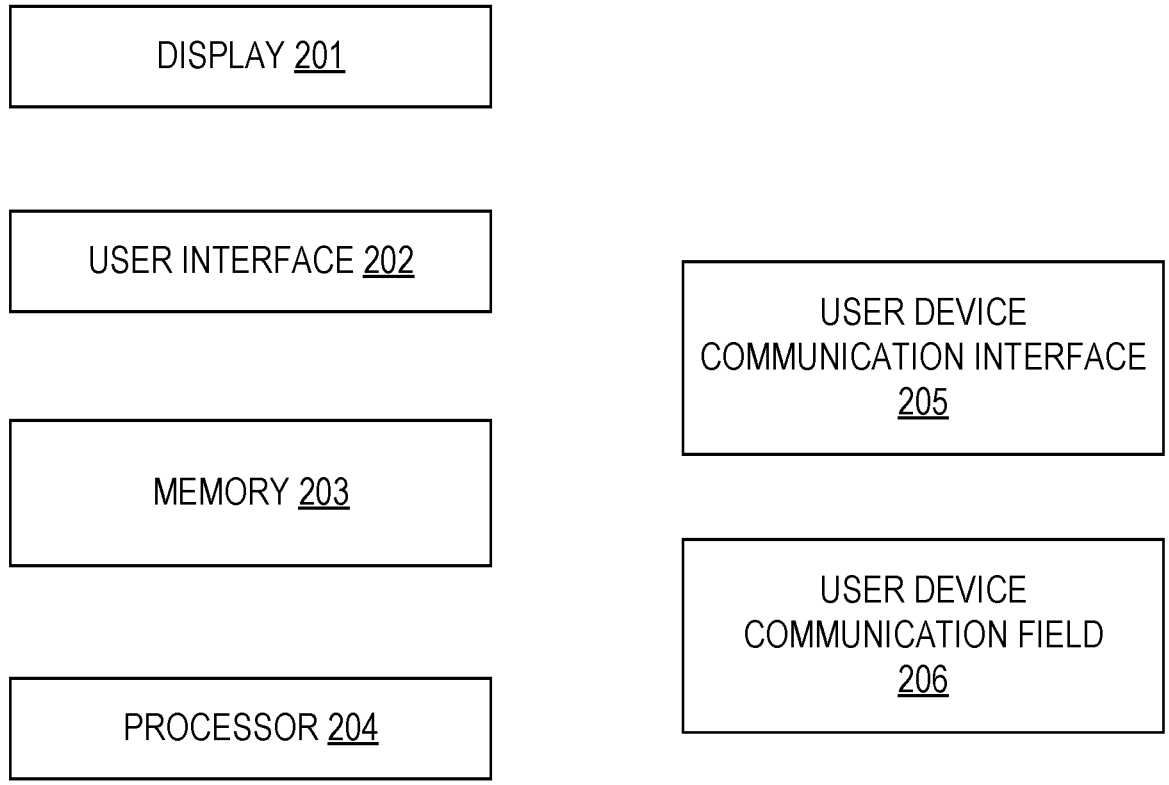
FIG. 2 is a diagram illustrating a user device according to an example embodiment of the present disclosure.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

An example system, method, and computer-accessible medium can be provided which can facilitate blocking of malicious transactions based on data received from any NFC enabled data source. For example, information encoded on a user's EMV standard-based credit card can be read by a mobile device, or other similar device, upon physical proximity of the credit card to the device. A credit card is often encoded to provide digital information to the device without any configuration—accordingly, the information on the card can be read by any piece of software installed on the digital device. However, a credit card can be encoded to include, for example, a digital tag. When the credit card is in proximity to a device, the digital tag can first be read by the mobile device.

The digital tag can be configured to cause, when read by a mobile device, an application identified by the digital tag to be launched on the mobile device. The digital tag can, for example, beconfigured to restrict the requested information to be accessible only by the application to prevent unauthorized access to the requested information. The launched application can, for example, prevent unauthorized access to the requested information. The digital tag can, for example, be configured to restrict the requested information to be accessible only by the application to prevent unauthorized access to the requested information. The launched application can, for example, be configured to prevent other applications on the mobile device from accessing the requested information. The application associated with the digital tag can be installed on the mobile device by the user. The tag can be generated according to the NFC Data Exchange Format (NDEF) specification. The NDEF tag can further be configured as an Android Application Record (AAR) launch tag. The AAR launch tag can be associated or registered to a particular application, e.g., the authorized or intended application, by the operating system installed on the mobile device. Upon receipt of the AAR launch tag by the mobile device, the mobile device can prioritize the associated application for launch. In some examples, the launch of the associated application can preclude other applications from launching in response to the receipt of the AAR launch tag by the mobile device.

The application associated with the digital tag can further be configured to perform a variety of functions. For instance, the application can send a notification to a user when the application has been launched more than a pre-determined number of times in a pre-determined period of time. The application can also create a list of other applications installed on the device. Any other functionality generally associated with an application on an operating system, such as for example, an application on the Android operating system, can be programmed into the device. Further, the digital tag can provide associational, temporal, and interference parameters related to the association, sequencing, temporal control, and interaction of the specified application and other applications The implementation and customization of these parameters can improve customization, operation, data protection, device security, and user experience.

Example embodiments of the present disclosure provides numerous benefits. Malicious applications and otherwise unauthorized applications can be installed on a device and can be configured to launch whenever a communication signal, such as a contactless communication field (e.g., an NFC field), is detected. The use of a digital tag as described herein can prevent launch of malicious or otherwise unauthorized applications, and limiting execution to only one or more authorized applications. For example, the use of a digital tag as described herein can prevent a malicious application from, upon detection of an NFC signal, reading or querying for information (e.g., account information or other sensitive information). This can increase security and increase the user's control over the applications that execute on his or her device. User control can be further increased through execution prioritization and associational, temporal, and interference parameters as described by example embodiments of the present disclosure.

FIG. 1 is a diagram illustrating a first device, 100. The first device can be any device capable of storing information such that the stored information can be accessed. First device 100 can be capable of storing a record 101. The first device can also have a processor 102. Processor 102 can be any suitable, commercially available, or custom designed processing circuitry. The first device can also have a communication interface 103 capable of generating a first device communication field 104. The first device can also have memory 105, which may include one or more applications or applets capable of performing the functionality described herein. Examples of first device 100 can include any device capable of containing a record 101 and able to communicate through a communication interface 103. Examples include any NFC device, such as a payment card, credit card, a debit card, a user identity card, a cell phone, a smart phone, an RFID card, a tablet, or a computer.

The first device 100 can also be a smartcard, with any suitable smartcard operating system stored on the first device 100. For example, the operating system can be stored on memory 105. The card operating system can be run using the processor 102 of first device 100. Two examples of operating systems available for smart cards include JavaCard and the MULTOS Card Operating System. Card operating systems can allow for on-card application development of programs that need to run within the secure environment of the smartcard chip, such as for example, chip enablement, issuance, controlling files, and managing data loads. Specific applications can be installed on the card operating system to, for example, generate NDEF tags that follow certain specified parameters. These generated tags can be stored in record 101.

Record 101 can include any information that is accessible by a suitable computing device. Record 101 can be stored within memory 105. Record 101 can be stored in any suitable data type, including Boolean, byte, cbyte, date, decimal, integer, long, number, string, or any combination of those data types. Record 101 can also be stored as delimited, fixed, or mixed data. Record 101 can contain multiple pieces of data, which all can have corresponding meta-data. The records can also include custom data types or data fields. Non-limiting examples of data can include information such as the first device's identifier number, a credit card number, a personal account number (PAN), a user name associated with the first device, an expiration date for the first device, a card verification value (CVV) code, a text string, and a phone number.

Record 101 can also be stored in a manner to allow for data to be exchanged over the NFC Data Exchange Format (NDEF), which allows for the exchange of information between any compatible NFC device and another NFC device or tag. NDEF is strictly a message format. It is a binary message encapsulation format to allow for the exchange between NFC enabled devices. NDEF messages can contain payloads of arbitrary type and size. The NDEF data format can be used to store and exchange information such as Uniform Resource Identifier (URIs), plain text, etc., using a format that is commonly understood. The NDEF data format can further support the exchange of NDEF messages as a mechanism to allow for the exchange of NDEF records. Each NDEF record can contain a structure that identifies the content of the record as well as the size of the record. An NDEF record can contain on a basic level two components, a record type used to provide context to a payload data and a payload data. Together, these two components represent the action to be taken by a device upon receipt of an NDEF record. One NDEF message can contain more than one NDEF record. The NDEF tag itself can be created dynamically. For example, the NDEF tag can be generated at run-time by, e.g., an applet stored in the memory 105 of the first device 100. For example, the NDEF tag can be based on a random number generator or externally introduced data. An NDEF tag is read when a card, or a chip contained in the card, is exposed to a properly aligned magnetic field and a request is issued for a specific NDEF message.

Record 101 can further be configured and stored as an Android Application Record (AAR) launch tag. An AAR launch tag is a type of NDEF record, which is used by Google's Android® operating system, to signify to an NFC device that an explicitly defined application should be used to handle the NFC tag. An AAR launch tag can include a package attribute, which can identify which Android application will handle or process the NFC tag. The package attribute can identify which Android application will be launched in response to the tag.

Memory 105 can be a read-only memory, write-once read-multiple memory or read/write memory, e.g., RAM, ROM and EEPROM, and a first device 100 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. The read/write memory can also be read many times. The memory of first device 100 can be programmed with instructions to generate a record 101. Record 101 can further include digital tags, which can be generated based on instructions included in memory 105. The memory of first device 200 can also include instructions stored as specialized applets, such as a JavaCard applet. For example, memory 105 can contain one or more applets configured to generate one or more NDEF tags, one or more of which can further be configured to be one or more AAR launch tags associated with one or more Android applications. Memory 105 can thus advantageously be modified if needed to change which Android application on an Android device is caused to launch responsive to receipt of a tag. In another example, memory 105 can be configured to generate a digital tag which is configured to be compatible with a different operating system or different application.

Memory 105 can store other information, such a user identifier. Record 101 can also be included in memory 105. A user identifier, algorithms, other information such as cryptographic keys can also be stored in memory 105. Memory 105 can be divided into several zones, with each zone having a different level of security. The processor 102 can keep track of which memory addresses belong to which zones and the circumstances under which each zone can be accessed. In an example embodiment, the memory 105 can be divided into four zones: a secret zone (such as a secure element), a confidential zone, a usage zone, and a public zone.

Communication interface 103 can be of any suitable technology capable of sending or receiving data over a distance Examples of such technology include, for example, Wi-Fi, WLAN, RF, radio, IR, Bluetooth, RFID, Near-Field-Communication (NFC) or any combination thereof or any other appropriate architecture or system that facilitates the communication of signals, data, and/or messages. Similarly, any suitable hardware level and software level algorithm can be chosen to allow for the transfer of data on a first device communication field 104. The first device communication field can be generated by communication interface 103. Examples of algorithms include the asynchronous connection-less protocol, synchronous connection-oriented link, link management protocol, host controller interface, or low energy link layer. Information can be communicated using the NDEF data exchange format. The use of this format allows for the exchange of both NDEF messages and NDEF records. The NDEF data format allows for the exchange of NDEF records. Each NDEF record can contain a structure that identifies the content of the record as well as the size of the record. An NDEF record can contain on a basic level two components, a record type used to provide context to the payload data and the payload data. Together, these two components represent the action to be taken by a device upon receipt of an NDEF record.

FIG. 2 is a diagram illustrating a user device 200. Non-limiting examples of user device 200 include a personal computer, a laptop, a tablet, an electronic reader, a cell phone, an NFC reader, or a smart phone. User device 200 can include a display 201, a user interface 202, memory 203, a processor 204, a user device communication interface 205 with a user device communication field 206. User device 200 can further be configured to contain one or more operating systems, such as for example, the Android operating system, and one or more applications or applets capable of performing the functionality described herein.

Memory 203 can be a read-only memory, write-once read-multiple memory or read/write memory, e.g., RAM, ROM and EEPROM, and a user device 200 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

Memory 203 can further be configured to be installed with an operating system or special instructions. The installed operating system can further be configured to install additional compatible pieces of software, such as applications or programs. Examples of commercial operating systems include for example the Android operating system, iOS, Windows, Debian, Linux, and Linux variations such as Ubuntu. Special purpose operating systems can also be installed on memory 203. As another example, more than one operating system can be installed on memory 203, allowing a user of the user device 200 to select which operating system the user wishes to use.

Display 201 can be selected from any suitable two-dimensional or three-dimensional display, such as a light-emitting diode, liquid crystal display, digital light processing display, or organic light-emitting diode display. User interface 202 can be selected from any suitable user input device such as a touchpad, a touchscreen, a mechanical switch, natural language user interface, a click-wheel, QWERTY keyboard, mouse, gesture recognition, or capacitive touchscreen.

User device communication interface 205 can be of any suitable technology capable of sending or receiving data over a distance. Examples of such technology include, for example, Wi-Fi, WLAN, RF, radio, IR, Bluetooth, RFID, Near-Field-Communication (NFC) or any combination thereof or any other appropriate architecture or system that facilitates the communication of signals, data, and/or messages. Similarly, any suitable hardware level and software level algorithm can be chosen to allow for the transfer of data on user device communication field 206. User device communication field 206 can be generated by user device communication interface 205. Examples of algorithms include the asynchronous connection-less protocol, synchronous connection-oriented link, link management protocol, host controller interface, or low energy link layer. Information can be communicated using the NDEF data exchange format. The use of this format allows for the exchange of both NDEF messages and NDEF records. NDEF messages are a further mechanism for the exchange of NDEF records.

First device 100 and user device 200 can also communicate with one another using a network. Network can be any means, mechanism, protocol, or pathway to allow information to be transferred between the first device 100 and user device 200 including but not limited to Wi-Fi, WLAN, RF, radio, IR, Bluetooth, cellular, near-field communication, SMS, MMS, a phone call, any combination thereof, or any other suitable architecture or system that facilitates the communication of signals, data, and/or messages. The first device and the user device can be in communication through a single network or a multitude of networks.

In an example embodiment, first device 100 can become energized when it comes close to an NFC reader which can be contained on user device 200. The NFC reader can emit a magnetic field which can energize first device 100 (e.g. a smartcard) through inductance. The first device, once powered, through this or another method, can then emit an NFC signal. Upon detecting the NFC signal emitted by first device 100, user device 200 can automatically attempt to read an NDEF message by sending an NDEF request to first device 100. First device 100 can accept the request from user device 200 and respond with an NDEF message. The NDEF message can further contain at least one record that is an AAR launch tag.

Upon first device 100 and user device 200 being within physical proximity of each other, the user device can request information from the first device. In response to the request, the first device can transfer the NDEF tag, which may contain one or more records including an AAR launch tag to user device 200. The first device can also be configured to emit information automatically to any user device 200 capable of receiving information from first device 100. This can be done, for example, when first device communication field 104 overlaps with user device communication field 206. This transfer of information between the first device and the user device can be accomplished through the means described above.

The first device 100 can be configured to include for example, information such as a credit card number, and associated information, such as the CVV number, user name, and expiration date. This first device 100 can further be configured to transfer this information to user device 200 through the use of NFC or a similar medium. This information can be accessed by any second device upon physical proximity of the two devices. As explained above, malicious software that can be installed on user device 200 can be awaiting or listening for an NFC signal of the first device 100, and access the information being transmitted over the NFC signal from first device 100. In some examples where malicious software is installed on a user device 200, the information can be obtained in the background, without the user being aware, and used by the malicious software on user device 200 to facilitate and conduct fraudulent actions or transactions.

In other examples, malicious software can be installed on a second user device (not shown in FIG. 2) that can be placed in proximity to the first device 100. If the second user device is placed in sufficient proximity to the first device 100 such that the second user device can read the NFC or other signal provided by the first user device. In these examples, malicious software on second user device can facilitate and conduct fraudulent actions or transactions based on the read signal, if not precluded by the AAR launch tag.

As previously described, the AAR launch tag generated by the one or more applets of the contactless card can be configured to launch one or more specified applications. In some embodiments, AAR launch tag can be scanned or checked by a security server or a security application to identify all applications specified by the tag. In some examples, the one or more of the applications specified for launch by the AAR launch tag can be configured to retrieve all applications associated with the AAR launch tag. Once identified the server can perform a security review of the applications, in which the applications can be scanned and checked for malicious elements (e.g., known software viruses) and for functionality that exceeds system or security rules (e.g., unauthorized data access, unauthorized data export, unauthorized internal or external communications).

In some embodiments, the application can send to the security server or security application a list of other applications that are installed on the operating system. The security server or security application can use this information, which may be collected from multiple devices, to screen for malicious software. For example, the server could maintain a list of software that is known to be malicious. The server could, for example, simulate or emulate the software from the list to replicate in software the process of sending information from a first device 100 in the manner described herein to observe if the various applications are listening for and sending information to another source that are received from first device 100. The server can send a notification to the launched application, through the launched application, or by any other means, to the user of the first device that his or her device contains software that matches the list of suspected malicious software maintained on the server. If the security review is successfully completed, the applications can be launched. If the security review identifies one or more security issues or potential security issues, the applications can be precluded from launching or held in abeyance until the issues have been resolved. In some examples, the client device can generate an alert or display for the user upon receipt of the notification from the server. In other examples, the server could present the notification to the user via another means (e.g., a pop-up notification, a text message, an email, a telephonic notification). The alerts and notifications can provide one or more messages stating that the application will not be launched. In some examples, the alerts and notifications can provide security information relating to the application that will not be launched.

In some embodiments, first device 100 can further be configured to include a tag in its record 101, such as an AAR tag, appended to the information typically sent by the first device. The AAR tag can be configured to, once received by the user device, launch an application specified by the AAR tag. This tag can be configured to first be sent to user device 200, before any other sensitive information contained in first device 100 is transferred, and this tag can be configured to restrict the information to be accessible only by the application to prevent unauthorized access. Only the application specified by the AAR launch tag can be launched on the user device 200 (or any second device) upon receipt of the tag. The operating system of the user device 200 can be configured to only allow the launched application, or other specified applications, to access the additional information sent by first device 100. The launch of this application first would prevent a second application from being launched responsive to the presence of the NFC field. Accordingly, a malicious application (or other malicious software) would be prevented from reading the information being transmitted by first device 100 as its launch or execution would be hindered or halted by the launch of the application specified in the AAR tag. First device 100 can also be configured to include or generate a collection of tags, to allow for this process of launching an application to be compatible across operating systems and user devices. Thus, a more robust protection can be designed for the data contained on first device 100.

As an example, a user may either tap their payment card (such as first device 100) to the back of their Android phone (such as user device 200) or store their card in a phone wallet immediately adjacent to the phone's NFC reader. An application can be installed on the phone that has been programmed to read the EMV applet on the card so as to read the credit card number, personal information, card verification value (CVV) code and expiration date from the card. This application could have been installed maliciously, pretending to be another kind of software such as a game, social networking application, or entertainment application. The malicious application can also be inserted into the code of otherwise authentic applications. These malicious applications can launch in the background, unseen by the user, and can read the card's information. Once read, this information can be uploaded to a backend server and harvested for fraud. To block this, as described in the example embodiments, additional software may be installed on the card's chip to prevent other applications on a reading device, other than the card issuer's application, from reading the payment card. The protective software generates an NFC NDEF Message with one or more NDEF Records. One of these NDEF Records may be an AAR launch tag configured to cause an operating system on the reading device to launch the card issuer's application on the reading device and to preclude the launch or further operation of other applications on the reading device. The Android operating system, for example, is configured to only allow one application to read information from the Android system memory at a time. The launch of the card issuer's application prevents the non-user initiated covert launching of malicious third party apps that read smartcard data when a card is stored next to an NFC enabled Android device. Thus, any information which is contained on or that can be sent from the smartcard to the user device 200 is intercepted by the first party application.

The addition of the NDEF records to the smartcard may not prevent applications that have already been launched by the user on user device 200 from accessing or requesting information on the first device 100. Applications on the Android OS can be automatically launched in the presence of events, such as the presence of an NFC signal. When no application is open or otherwise active on user device 200, the example embodiments of the AAR launch tag of the present disclosure will cause the specified application to launch on user device 200. In addition, the AAR launch tag can be configured to preclude applications other than the specified application from opening or otherwise becoming active. The AAR launch tag can be configured to preclude applications other than the specified application from opening or otherwise becoming active, regardless of the status of the specified application. This can be accomplished through the operating system of the user device 200, such as the Android OS, for example. For example, when user device 200 is active and an NFC radio is active, the NFC radio of user device 200 can be configured to be active according to the manufacturer of the user device 200. For example, the NFC radio of user device 200 can be active when the screen of user device is active and the user device is in an unlocked state. In some examples, the user device 200 can be an Android device, and the NFC radio can be configured to be active only when the Android screen is on and the device is in an unlocked state. However, when an application is already launched, the user of user device 200 is not inhibited from accessing or using that application.

As an example, a user can have his or her NFC-enabled credit card (e.g., first device 100) in his or her purse or wallet. Throughout the course of the day, the enabled credit card can enter into NFC communication proximity with the user's personal device or with other NFC enabled user devices. The user can have a device with the Android operating system installed on his or her device. The NFC-enabled credit card can further be configured to include a tag in its record 101, such as an AAR launch tag, configured to cause a particular application to launch on the user device, for example, a financial server provider (or other service provider) application associated with the credit card. If the particular application is not already installed on the user device, the tag can further be configured to cause the Android device to launch an application store (e.g., the Google Play Store), or another similar platform, to allow for the designated application to be installed on the user device.

The NDEF tag or AAR record may be configured with the package name of a specific Android application. Thus, upon receipt of the particular AAR record or NDEF tag, the operating system, or the Android operating system, will launch the specified application when the contactless card is tapped to the phone. If the specified application is not currently installed on the Android device, it will cause the Google Play Store to be launched to the page where the specified application can be downloaded and installed onto the Android device.

The digital tag in the first device 100 can further be configured to cause the user device 200 to access a server to download the application associated with the tag received from first device 100. This can be accomplished by including information identifying the particular application in the first device 100. The server can be a standard server well-known and commercially in use to communicate over a network with a device. In one example, the tag in the first device can cause a specialized application to interface with the server and cause the application to be downloaded. One example of such a specialized application is the Google Play Store on Android® OS. Other examples of such applications include the App Store on the iOS® operating system and the Microsoft Store allowing Windows® applications to be downloaded. Yet another example is the Canonical Store and the Ubuntu Software Center on the Ubuntu® operating system. Other specialized package managers exist for various operating systems.

In examples where the specialized application is the Google Play Store, the server can be hosted by Google®. If the application is not installed on the user device, receipt of the digital tag can cause the Google Play Store to be launched to the relevant page or pages for the application. One or more of these pages can present a button to download and install the application onto the user device. If the user clicks the button the application can be downloaded, and during the download and subsequent installation the user interface of the Google Play Store can indicate a "busy" state. Once complete, the "busy" state indication can be removed and the user interface can present another button for launching the application. In addition, this button can be presented by the user device in the form of an application icon displayed on the Android desktop so the user can launch the application from the desktop.

In some embodiments, the record 101 can further specify additional parameters related to launching this application. These aspects can relate to associational, temporal, and an interference parameters. For example, associational parameters can include identifications of one or more applications to launch in addition to the application specified by the AAR tag, and identification of a sequence for launching the one or more additional applications. Exemplary sequences include, without limitation, a linear sequence (e.g., one application after another), simultaneous launching, and completion-triggered launching (e.g., launching a second application only after a previously-launched first application closes and/or completes an operation, launching an application only after all other previously launched applications closes and/or perform a specified operation, and launching an application only after one or more operations are completed, whether or not the one or more operations are related to or performed by the other launched applications).

As another example, temporal parameters can specify time-related aspects of application launching. For example, temporal parameters can include a designated time to launch the application specified by the AAR launch tag, designated times to launch one or more additional applications, a time interval between launching applications, and a time delay precluding the launch of one or more additional applications following the launch of the application specified by the AAR launch tag. As another example, the application specified by the AAR launch tag can be launched only after the user device has gone a specified period of time without receiving user input, or upon receipt of a particular specified input (e.g., certain keystrokes or touch screen input).

As another example, interference parameters can specify the effect of the launched application on one or more other applications. For example, an interference parameter can pause the execution of one or more applications once the application specified by the AAR launch tag has launched, for a predetermined time period, until a certain action is performed by the launched application, until the launched application signals other applications can resume, or until the launched application closes. An interference parameter can also completely close the one or more applications.

Accordingly, through the use of associational parameters, temporal parameters, and interference parameters, control over the applications that can be executed, the timing and sequencing of their execution, and the capability to preclude the operation of other applications, especially during critical periods of operation of certain applications, can be established. This can improve the performance and operation of the first device 100 and the user device 200, and can also improve data security and the user experience.

Figure 3:
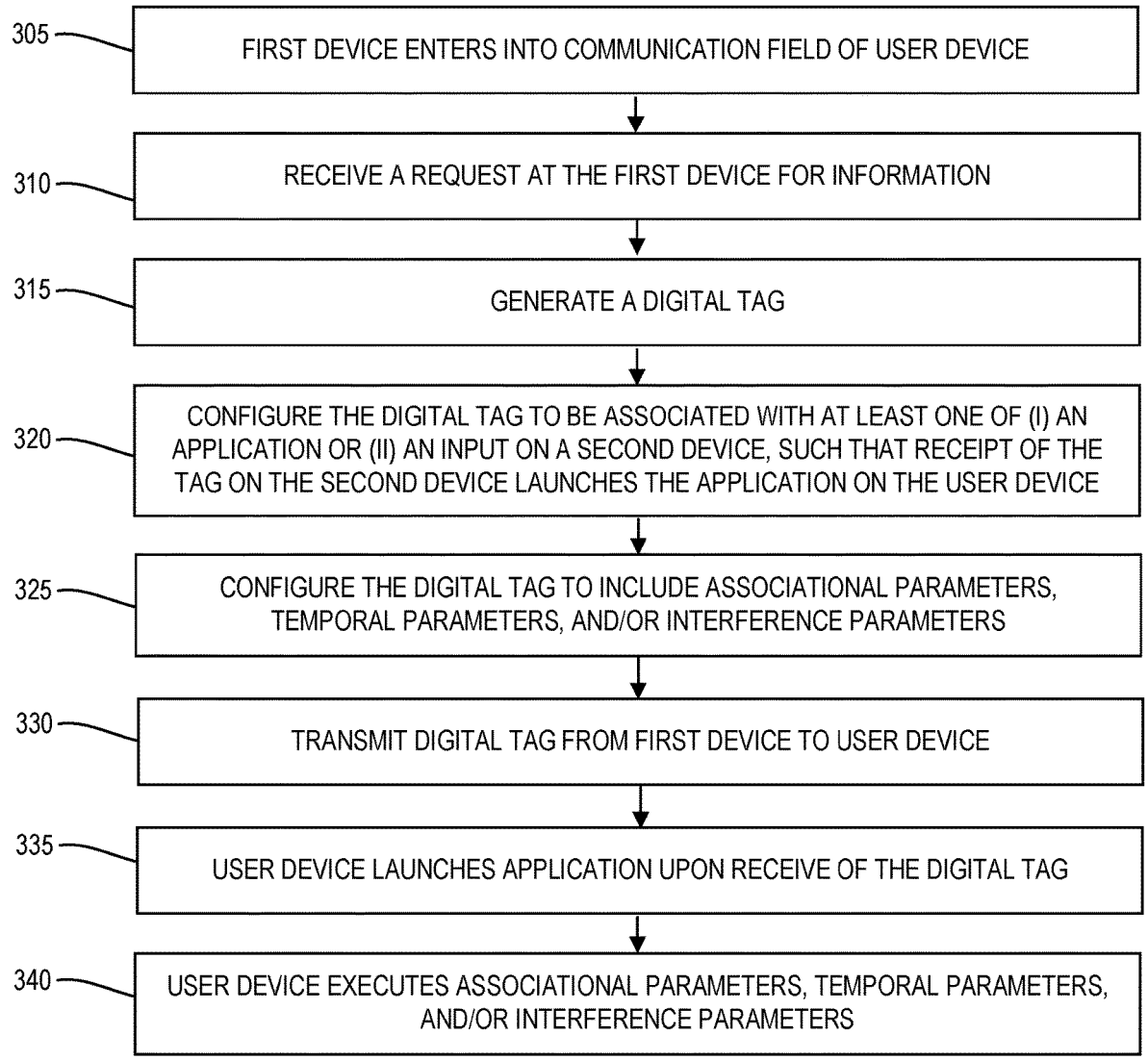
FIG. 3 is a flow chart of a method according to an example embodiment of the present disclosure.

FIG. 3 is a flow chart diagramming a method 300 of transferring information from first device 100 to user device 200 in an example embodiment of the present invention. The method commences at step 305, in which an applet is stored on a first device 100, which is configured to generate a collection of digital tags. The collection of tags can be as described above, and the collection can include at least one AAR launch tag. In some examples, these tags can be pre-generated once and can be static. In these examples, use of an applet is not necessary to generate the digital tags. In other examples, the collection of tags can be dynamically created based on, e.g., the current operating status of the first device 100, the user device 200, and any applet or application executed thereon.

In step 305, the communication field 104 of the first device 100 can enter into a communication field generated by the user device 200, such as an NFC communication field or other contactless communication field. In step 310, first device 100 can receive a request for information. In some examples, this step can occur when the first device communication field 104 overlaps with another communication field. For example, an NDEF file is read when the card/chip is exposed to a properly aligned magnetic field. As another example, this step can occur when NFC apparatus in first device 100 being activated in the presence of an external field or device, such as user device 200 or another device.

In step 315, first device 100 can generate one or more digital tags. In this step, first device 100 can further include additional information along with the one or more digital tags. Examples of additional information sent along with the digital tag can include user information or credit card information. In step 320, the one or more digital tags can be configured in such a manner that the emitted tag can be associated with at least one of an application, such that receipt of the emitted tag on the second device causes the second device to launch the associated application on the second device. The configuration of the tag can also be done in a manner which corresponds with the NDEF format. The tag can further be configured to be an AAR launch tag that can specify a particular action for the operating system of the user device 200 to take upon receipt of the AAR tag. In step 325, the one or more digital tags can be configured to include one or more associational parameters, one or more temporal parameters, and/or one or more interference parameters.

In step 330, the one or more digital tags may be transmitted from the first device 100 to the user device 200. In step 335, upon receipt of the one or more digital tags, the user device 200 may launch one or more specified applications as specified by the AAR launch tag. In examples where a collection of tags is sent, the AAR launch tag can be the first tag read by the user device 200. In step 340, one or more associational parameters, one or more temporal parameters, and/or one or more interference parameters, if present, may be executed by the user device 200.

Figure 4:
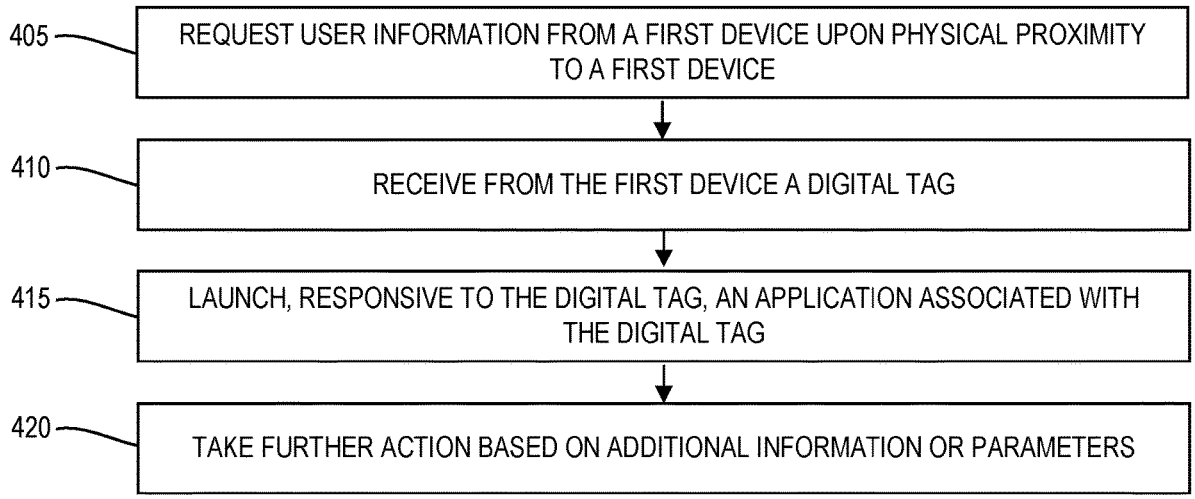
FIG. 4 is a flow chart of a method according to an example embodiment of the present disclosure.

FIG. 4 describes a method for exchanging information. Method 400 starts at step 405, in which information is requested from a first device 100 when a user device 200 is in physical proximity to a first device 100. This can occur when user device 200 recognizes the presence of a first device through the overlap of communication fields of first device 100 and user device 200 overlap. This can also occur through software in user device 200 recognizing the presence of a communication field external to user device 200. In step 410, a digital tag is received from first device 100. This digital tag can include information requested from the first device 100 by the user device 200. In some examples, the digital tag can include additional information not requested by the user device 200. For example, the digital tag can include one or more one or more associational parameters, one or more temporal parameters, and/or one or more interference parameters. In either case, the information can be in the form of one or more records, each of which can be used in an unauthorized manner by a malicious application.

In step 415, an application associated with the digital tag can be launched by the user device 200 responsive to the received tag. For example, the launched application can be defined by meta-data or specialized fields in the received tag. The launched application can then read the other information that is being sent by the first device to the user device, such as credit card information or other personal information, as well as any associational, temporal, and interference parameters. Thus, the application can intercept the other information being sent to the user device when it is launched, and can prevent other applications on the user device from accessing the information. Further, the application can prevent other applications from being executed without the user specifically requesting and/or authorizing their execution. Accordingly, this advantageously prevents the execution of applications, including malicious applications, without authorization and without the user's knowledge. In step 420, the application can read and act on any additional information or parameters.

Figure 5:
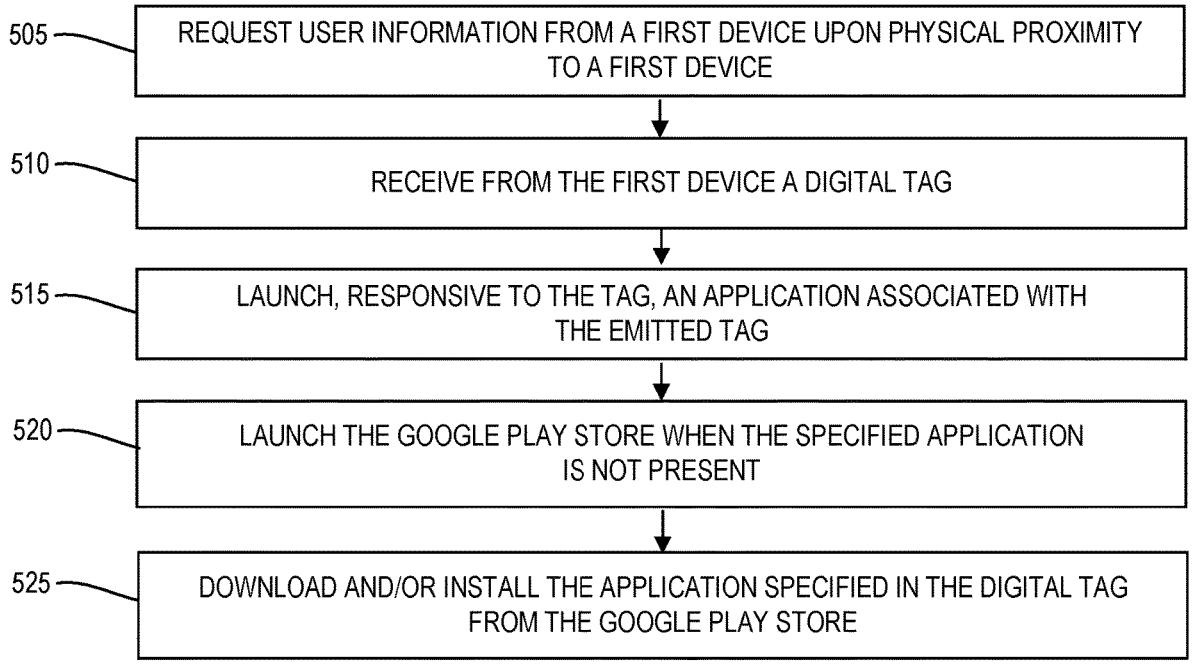
FIG. 5 is a flow chart of a method according to an example embodiment of the present disclosure.

FIG. 5 describes an embodiment of the present invention, method 500. Method starts at step 505, in which information is requested from a first device (e.g., first device 100) when a user device (e.g., user device 200) is in physical proximity to a first device. This can occur when user device 200 recognizes the presence of a first device through the overlap of communication fields of first device 100 and user device 200. This can also occur through software in user device 200 recognizing the presence of a communication field external to user device 200. In step 510, a digital tag is received from first device 100. This digital tag can be information requested from the first device 100 by the second device 100. In some examples, the digital tag can include additional information not requested by user device 200. In either case, the information can be in the form of one or more records, each of which can be used in an unauthorized manner by a malicious application. This digital tag can be platform or operating system specific. In step 515, an application associated with the emitted digital tag can be launched responsive to the received tag. For example, on an Android operating system, the launched application can be defined by meta-data or specialized fields in the received tag. In step 520, the second device can, upon not finding the application specified in the emitted digital tag, launch a package manager or application manager, such as for example, the Google Play Store, in order to identify and allow a user of the user device to download the specified application. In step 525, the application specified in the emitted digital tag can be downloaded and/or installed by the user device. This allows the device to automatically install the specified application if the application is not present on the device.

Figure 6:
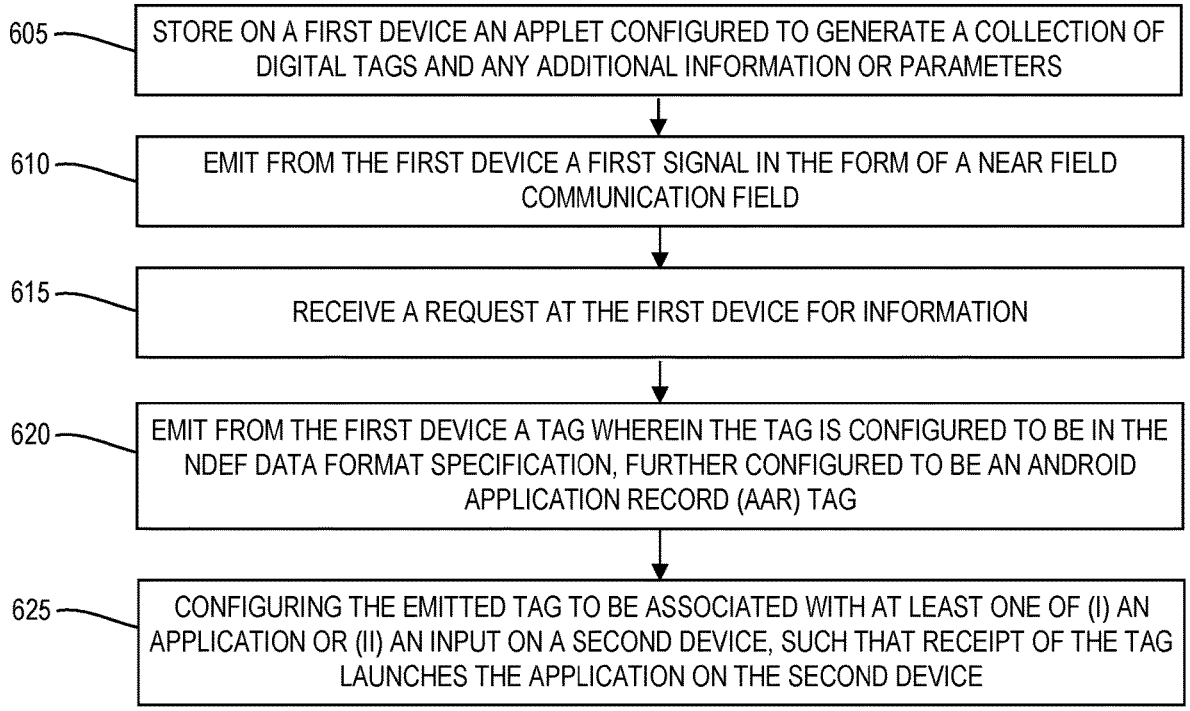
FIG. 6 is a flow chart of a method according to an example embodiment of the present disclosure.

FIG. 6 describes an embodiment of the present invention, method 600. Method may begin at step 605, in which an applet is stored on a first device (e.g., first device 100), which is configured to generate a collection of digital tags. These tags can be pre-generated, in which case an applet can optionally not be used to generate the digital tags (i.e., the digital tags can be stored in the memory of the first device without the need for creation by the applet). In some examples, the collection of digital tags can include additional information, such as user account information and/or user identification information, and the collection of digital tags can further include one or more parameters, such as associational, temporal, and interference parameters.

In step 610, a signal is emitted from the first device in the form of a near-field communication field. This can be emitted in response to an external trigger, such as an electronic field, or first device 100 can be in a state of constant emission of the signal. In step 615, first device 100 can receive a request for information. This step can, for example, take the form of the NFC apparatus in first device 100 being activated in the presence of an external field or device. This can also occur when the first device communication field (e.g., first device communication field 104) overlaps with another communication field.

In step 620, first device 100 can emit a digital tag, wherein the tag is configured to be in the NDEF data format specification, further configured to be an Android Application Record (AAR) tag. In this step, first device 100 can transmit additional information along with the digital tag. Examples of additional information sent along with the digital tag can include user information or credit card information, and parameters, such as associational, temporal, and interference parameters. In step 625, the emitted tag can be configured to be associated with at least one of (i) an application or (ii) an input on a second device, such that receipt of the tag launches the application on the second device.

Figure 7:
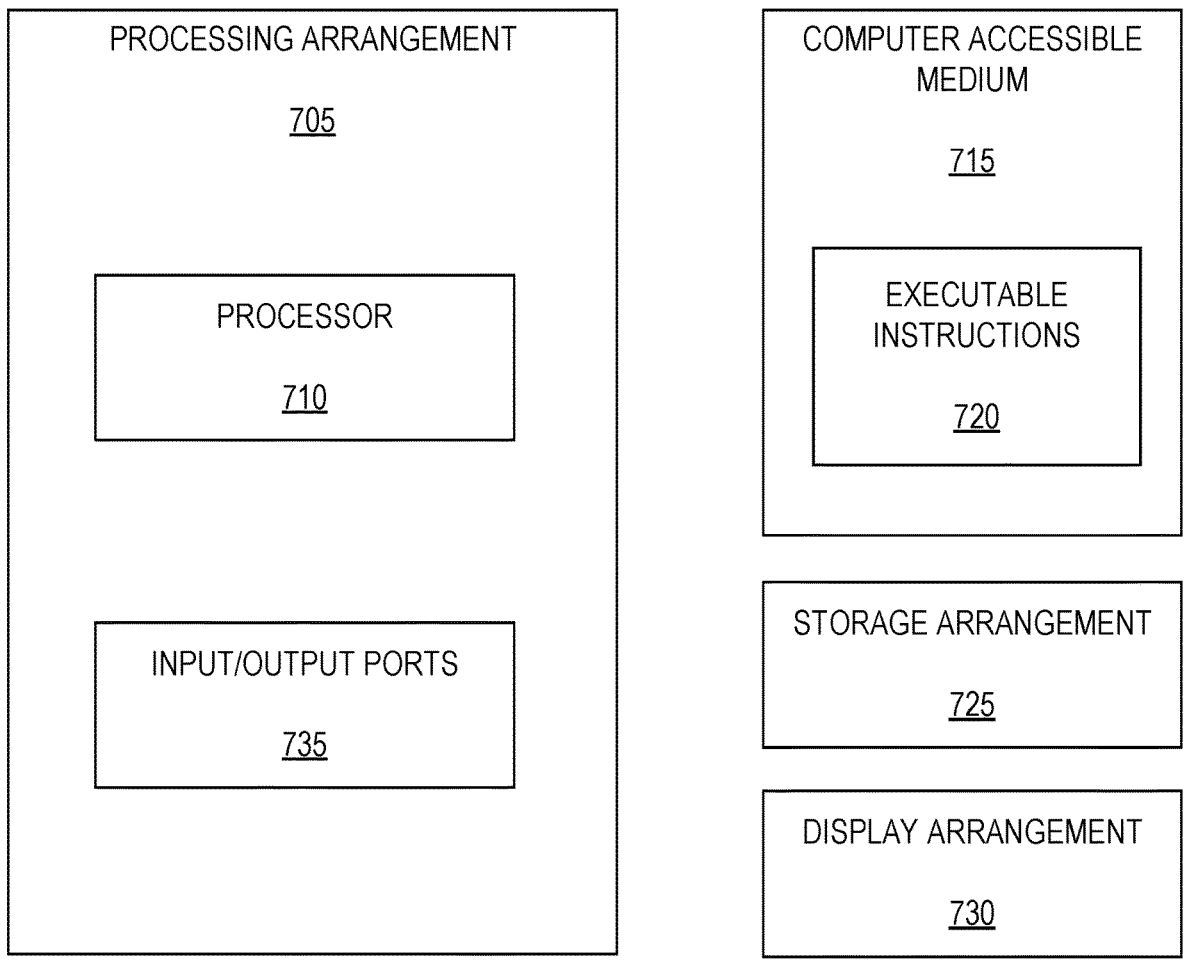
FIG. 7 is a diagram of a system according to an example embodiment of the present disclosure.

FIG. 7 shows a block diagram of an exemplary embodiment of a system 700 according to the present disclosure, which can be used to perform the procedures described below. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 220 thereon. In addition, or alternatively, a storage arrangement 725 can be provided separately from the computer-accessible medium 715, which can provide the instructions to the processing arrangement 705 so as to configure the processing arrangement to execute certain exemplary procedures, processes, and methods, as described herein above, for example.

Further, the exemplary processing arrangement 705 can be provided with or include an input/output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An application control system, comprising:
a smartcard comprising a processor, a memory storing a digital tag, and a communication interface, wherein the digital tag is associated with an application and configured to prompt a security review upon receipt of the digital tag by a client device, and wherein the processor is configured to, upon receipt of a request for requested information received from the client device, transmit the digital tag to the client device via the communication interface;
wherein, upon a successful completion of the security review, the digital tag is configured to prompt a launch of the application on the client device and restrict the requested information to access only by the application; and
wherein, upon an unsuccessful completion of the security review, the digital tag is configured to preclude a launch of the application on the client device.

2. The application control system of claim 1, wherein:
the transmission of the digital tag occurs after entry of the smartcard into a communication field, and
the communication interface is configured to transmit the tag via Near Field Communication.

3. The application control system of claim 1, wherein:
the digital tag is configured to prompt the launch of a plurality of additional applications, and
the digital tag specifies a sequence for launching the plurality of additional applications.

4. The application control system of claim 3, wherein the sequence comprises a linear sequence.

5. The application control system of claim 4, wherein the sequence comprises completion-triggered launching.

6. The application control system of claim 5, wherein the completion-triggered launching comprises launching a second additional application from the plurality of additional applications after the completion of an operation by a first additional application of the plurality of additional applications.

7. The application control system of claim 5, wherein the completion-triggered launching comprises launching a second additional application from the plurality of additional applications after a first additional application of the plurality of additional applications closes.

8. The application control system of claim 5, wherein the completion-triggered launching comprises launching a final additional application from the plurality of additional applications after all other additional applications of the plurality of additional applications close.

9. The application control system of claim 1, wherein the application is configured to prevent a second application from accessing the requested information.

10. The application control system of claim 1, where in the digital tag is configured to be a Near Field Communication (NFC) Data Exchange Format (NDEF) tag.

11. The application control system of claim 10, wherein the NDEF tag is configured to be an Android Application Record.

12. An application control method, comprising:
- receiving, by a smartcard, a request for requested information;
- transmitting, by the smartcard to a client device, a digital tag associated with an application;
- prompting, by the digital tag, a security review;
- prompting, by the digital tag upon successful completion of the security review, a launch of the application on the client device; and
- restricting, by the digital tag, access to the requested information to only the application.

13. The application control method of claim 12, further comprising precluding, by the digital tag upon an unsuccessful completion of the security review, a launch of the application.

14. The application control method of claim 12, further comprising transmitting, by the smartcard, the requested information with the digital tag.

15. The application control method of claim 12, further comprising transmitting the digital tag to a user device, wherein the digital tag is configured to prompt the launch of the application when the user device is inactive.

16. The application control method of claim 12, further comprising transmitting the digital tag to a user device comprising a display, wherein the digital tag is configured to prompt the launch of the application when no other application on the user device is active.

17. The application control method of claim 16, wherein the digital tag is configured to preclude any other application from opening or becoming active.

18. The application control method of claim 12, further comprising transmitting the digital tag to a user device, wherein the digital tag is configured to prompt the launch of the application when the user device has not received user input for a pre-determined period of time.

19. The application control method of claim 12, further comprising transmitting the digital tag to a user device, wherein the digital tag is configured to prompt the launch of the application when the user device is in an unlocked state.

20. A non-transitory computer-accessible medium having stored thereon computer-executable instructions, wherein, when a processor executes the instructions in response to receipt of a request for requested information, the processor is configured to perform procedures comprising:
- transmitting, to a client device, a Near Field Communication (NFC) Data Exchange Format (NDEF) tag, wherein the NDEF tag is configured to:
  - prompt a security review;
  - upon a successful completion of the security review, prompt a launch of an application on the client device;
  - restrict access to the requested application to only the application; and
  - upon an unsuccessful completion of the security review, preclude a launch of the application on the client device.

* * * * *